United States Patent
Hardy et al.

(10) Patent No.: US 10,390,068 B1
(45) Date of Patent: *Aug. 20, 2019

(54) TRAFFIC SYSTEM AND METHOD FOR HANDLING ADVERTISEMENTS WITH CONTENT BROADCAST NETWORKS INCLUDING RESPONSIVENESS TO CHANGES IN PROGRAMMING PARAMETERS

(71) Applicant: Visual Advertising Sales Technology, Grass Valley, CA (US)

(72) Inventors: David S. Hardy, Grass Valley, CA (US); Mark T. Elmasri, Yelm, WA (US); Asif Abdul Muneer Balgar, Dona Paula (IN)

(*) Notice: Subject to any disclaimer, the term of this patent is extended or adjusted under 35 U.S.C. 154(b) by 0 days.

This patent is subject to a terminal disclaimer.

(21) Appl. No.: 15/703,905

(22) Filed: Sep. 13, 2017

Related U.S. Application Data

(63) Continuation of application No. 15/334,245, filed on Oct. 25, 2016, now Pat. No. 9,781,461.

(51) Int. Cl.
| | |
|---|---|
| *H04N 7/10* | (2006.01) |
| *H04N 7/025* | (2006.01) |
| *H04N 21/262* | (2011.01) |
| *H04N 21/231* | (2011.01) |
| *H04N 21/235* | (2011.01) |
| *H04N 21/234* | (2011.01) |
| *H04N 21/232* | (2011.01) |
| *H04N 21/2668* | (2011.01) |
| *H04N 21/81* | (2011.01) |

(Continued)

(52) U.S. Cl.
CPC ......... *H04N 21/262* (2013.01); *H04L 51/08* (2013.01); *H04L 67/06* (2013.01); *H04N 21/231* (2013.01); *H04N 21/232* (2013.01); *H04N 21/234* (2013.01); *H04N 21/235* (2013.01); *H04N 21/2668* (2013.01); *H04N 21/812* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 7,742,946 B2 * | 6/2010 | Banks | G06Q 30/02 705/14.1 |
| 9,635,391 B1 * | 4/2017 | Hardy | H04N 21/23424 |

(Continued)

*Primary Examiner* — William J Kim
(74) *Attorney, Agent, or Firm* — FisherBroyles, LLP; Rob L. Phillips

(57) ABSTRACT

A computer-implemented system and method for providing information to a traffic system allowing a traffic system operator to make faster and better decisions related to whether or not to import specific break structure files. The system, via a dashboard, permits the traffic system operator to select a single network, a group of specific networks or all networks for importation of the specific break structure files. The system and method are configured to handle changes in any of three important programming categories, namely windows, breaks and programming content. The programming categories are separated into easy-to-read columns listing the number of changes for a given future time period allowing the traffic system operator to easily locate the changes. Such a system and method solves the problem of traffic system operators having to "blindly" import data.

14 Claims, 13 Drawing Sheets

(51) Int. Cl.
*H04L 12/58* (2006.01)
*H04L 29/08* (2006.01)
*H04L 29/06* (2006.01)

(56) References Cited

U.S. PATENT DOCUMENTS

| | | | | |
|---|---|---|---|---|
| 2002/0095339 | A1* | 7/2002 | Galloway | G06Q 30/02 |
| | | | | 705/14.41 |
| 2002/0184047 | A1* | 12/2002 | Plotnick | G06Q 30/0258 |
| | | | | 705/1.1 |
| 2003/0225629 | A1* | 12/2003 | Banks | G06Q 30/02 |
| | | | | 705/14.66 |
| 2012/0192222 | A1* | 7/2012 | Kumar | G06Q 30/0251 |
| | | | | 725/32 |
| 2013/0097629 | A1* | 4/2013 | Popescu | H04N 21/23424 |
| | | | | 725/32 |
| 2015/0237388 | A1* | 8/2015 | Popescu | H04N 21/26241 |
| | | | | 725/32 |

\* cited by examiner

The following changes in programming were detected for 07/18/2016 to 07/24/2016, an updated breaks file is also attached for the same. If the file is not attached you can download it by clicking here.

803

| Feature | 07/18/2016 - 07/24/2016 | | | Report | Grid |
|---|---|---|---|---|---|
| | Breaks | Windows | Titles | | |
| A&E | 0 | 4 | 7 | Details | See Grid |
| A&E1 | 0 | 4 | 7 | Details | See Grid |
| A&E2 | 0 | 4 | 7 | Details | See Grid |
| A&E3 | 0 | 0 | 10 | Details | See Grid |
| BET | 0 | 0 | 1 | Details | See Grid |
| BRVO | 0 | 0 | 0 | Details | See Grid |
| BRVO1 | 0 | 0 | 2 | Details | See Grid |
| BRVO2 | 0 | 0 | 2 | Details | See Grid |
| BRVOS | 0 | 0 | 10 | Details | See Grid |
| BTX | 0 | 0 | 20 | Details | See Grid |
| CMTV | 0 | 0 | 0 | Details | See Grid |
| CMTV1 | 0 | 0 | 0 | Details | See Grid |
| CNBCS | 0 | 0 | 0 | Details | See Grid |
| CNN | 0 | 0 | 2 | Details | See Grid |
| CNN1 | 0 | 0 | 1 | Details | See Grid |

Fig. 8D

FXNC
Fox News Channel Schedule changes from 07/16/2016 to 07/24/2016

| Program Data for 07/16/2016 | | | | | |
|---|---|---|---|---|---|
| Original Data Published 07/14/2016 | | | Changes as of 07/15/2016 | | |
| 00:00:00 | 01:00:00 | Special Report With Bret Baier | 00:00:00 | 01:00:00 | Special Report With Bret Baier |
| 01:00:00 | 01:00:00 | Hannity | 01:00:00 | 01:00:00 | Hannity |
| 02:00:00 | 04:00:00 | FOX and Friends Saturday | 02:00:00 | 04:00:00 | FOX and Friends Saturday |
| 06:00:00 | 00:30:00 | Bulls and Bears | 06:00:00 | 02:00:00 | The Cost of Freedom |
| 06:30:00 | 00:30:00 | Cavuto on Business | 08:00:00 | 00:30:00 | America's Election HQ |
| 07:00:00 | 00:30:00 | Forbes on FOX | 08:30:00 | 02:30:00 | The Journal Editorial Report |
| 07:30:00 | 00:30:00 | Cashin' In | 11:00:00 | 02:00:00 | America's Election HQ |
| 08:00:00 | 00:30:00 | Bob Massi Is the Property Man | 13:00:00 | 02:00:00 | America's Newsroom |
| 08:30:00 | 00:30:00 | The Journal Editorial Report | 15:00:00 | 01:00:00 | Fox Report |
| 09:00:00 | 02:00:00 | America's News Headquarters | 16:00:00 | 01:00:00 | FNR Takeover: The Trump Convention |
| 11:00:00 | 01:00:00 | America's News Headquarters | 17:00:00 | 01:00:00 | Justice With Judge Jeanine |
| 12:00:00 | 01:00:00 | America's News Headquarters | 18:00:00 | 01:00:00 | The Greg Gutfeld Show |
| 13:00:00 | 01:00:00 | The Five | 19:00:00 | 01:00:00 | FNR Takeover: The Trump Convention |
| 14:00:00 | 01:00:00 | America's News Headquarters | 20:00:00 | 01:00:00 | Justice With Judge Jeanine |
| 15:00:00 | 01:00:00 | FOX Report | 21:00:00 | 01:00:00 | The Greg Gutfeld Show |
| 16:00:00 | 01:00:00 | Stossel | 22:00:00 | 01:00:00 | FNR Takeover: The Trump Convention |
| 17:00:00 | 01:00:00 | Justice With Judge Jeanine | 23:00:00 | 01:00:00 | Justice With Judge Jeanine |
| 18:00:00 | 01:00:00 | The Greg Gutfeld Show | | | |
| 19:00:00 | 01:00:00 | Red Eye With Tom Shillue | | | |

TRAFFIC SYSTEM AND METHOD FOR HANDLING ADVERTISEMENTS WITH CONTENT BROADCAST NETWORKS INCLUDING RESPONSIVENESS TO CHANGES IN PROGRAMMING PARAMETERS

FIELD OF THE INVENTION

The embodiments of the present invention relate to a system and method for the placement of advertisements with content broadcast networks and handling of programming changes.

BACKGROUND

The business of placing local and regional ads on cable television is very complex requiring the handling of literally tens of millions of "available 30 second slots" per month in most major traffic systems. The current systems and methods that control the placement of commercials in these time slots are quite inefficient and inflexible relative to processing and handling data. For instance, the current systems and methods are based on the number of minutes in a 24-hour military clock wherein the first minute after midnight is designated as 00:01:00 through 24:00:00 (midnight). The national and regional cable networks (e.g., ESPN, TNT, A&E) air national and/or regional commercials that are non-pre-emptible and also deliver inaudible electronic "cue tones" that tell the local traffic computer servers ("call traffic system") to insert a local commercial at the time of the cue tones. Typically, there are two to four 60 second cue tones per hour that are available into which the local traffic system may insert local commercials. Commercials typically are 30 seconds in length but can also be 15 seconds or 60 seconds in length.

Current systems and methods for the placement of advertisements with content broadcast networks tend to be inefficient and inflexible. This is especially evident when programming changes occur which require advertisement parameters to change accordingly.

Thus, it would be advantageous to develop an efficient and flexible system and method for the placement of advertisements with content broadcast networks including responsiveness to programing changes.

SUMMARY

The embodiments of the present invention are directed to a computer-implemented system and method for providing information to the traffic system allowing a traffic system operator to make faster and better decisions related to whether or not to import specific break structure files. In one embodiment, the system, via a dashboard, permits the traffic system operator to select a single network, a group of specific networks or all networks for importation of the specific break structure files.

The system and method are configured to handle changes in any of three important programming categories, namely windows, breaks and programming content. In one embodiment of the present invention, the programming categories are separated into a grid of easy-to-read columns listing the number of changes for a given future time period allowing the traffic system operator to easily locate the changes. Such a system and method solves the problem of traffic system operators having to "blindly" import data.

Other variations, embodiments and features of the present invention will become evident from the following detailed description, drawings and claims.

BRIEF DESCRIPTION OF THE DRAWINGS

FIGS. 8A-8F illustrates a series of screen shots according to the embodiments of the present invention.

DETAILED DESCRIPTION

Figure 1:
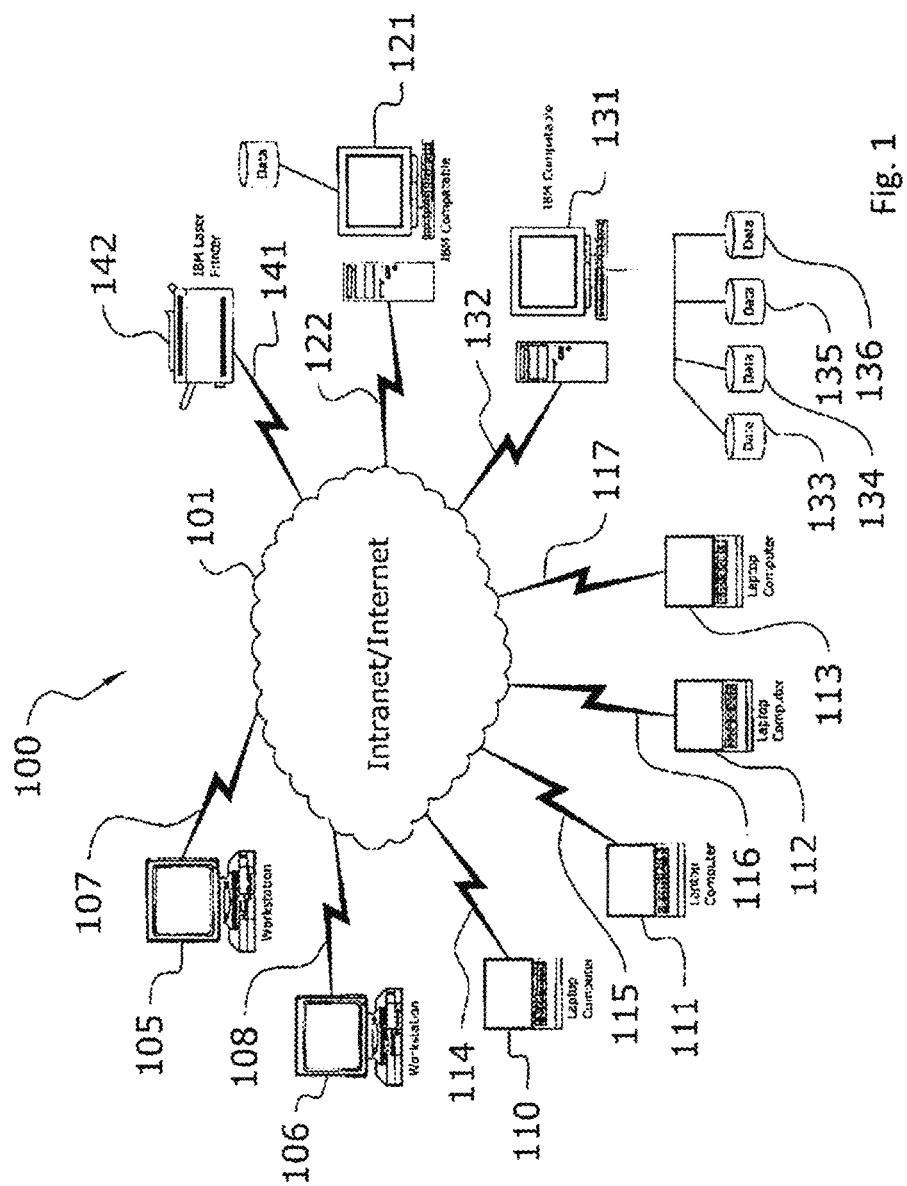
FIG. 1 illustrates a block diagram of network of an advertising/traffic system of the type utilized or encountered with the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

FIG. 1 illustrates a network 100 that facilitates an advertising and/or traffic system in accordance with the embodiments of the present invention. Network 100 includes Internet or Intranet 101 that connects various processing systems in network 100 to allow the exchange of data between the processing systems. One skilled in the art will recognize that processing systems are personal computers, system computers, routers, or other devices that can process digital data.

In network 100, desktop computers 105-106 are connected to Internet/Intranet 101 via paths 107-108. Laptop computers 110-113 are connected to Internet/Intranet via paths 114-117. One skilled in the art will recognize that paths 107-108 and 114-117 may be telephone lines, Ethernet lines, or any other manner of connecting processing systems. One skilled in the art will also recognize that any number of processing units may be connected to Internet/Intranet 101.

Information server 121 is connected to Internet/Intranet 101 via path 122. Information server 121 is a router or other processing device that controls data transfers between processing systems connected to Internet/Intranet 101.

Database server 131 is connected to Internet/Intranet 101 via path 132. Database server is a processing system that maintains various databases that are accessed by the embodiments of the present invention. In network 100, database server 131 maintains programming database 133, custom break structure database 134, standard break structure database 135 and client database 136.

Programming database 133 stores records for information about programs to be broadcast including time, length, and timeslots for advertisements. This information may be compiled by an outside provider and the compiled information is used to populate the database.

Client database 136 is a database that stores client information. The client information stored in client database 136 includes client contact information and login information, client network list and instance mappings, and client download schedules and download queues. This information may either be provided by the client directly or input and modified by personnel.

The standard break structure database 135 maintains the standard break structure specific to each network. The expected times are delivered to the traffic system along with the "windows" of time that the traffic system needs to ensure the cue tones are each received and advertisements played correctly.

The custom break structure database 134 maintains special break formats specific to each network during a specific program/event. Custom break formats override any standard break formats based upon "special rules" that are established by the networks. The system monitors dynamic data feeds from one or more of the networks and in some cases indexes the network break sites for custom information or changes. If a custom break format or change occurs or is transmitted to the system, the custom break format rules are applied accordingly thereby modifying the standard break formats. The custom break formats are then delivered to the traffic system along with "custom windows" of time that the traffic system uses to ensure cue tones are each received and advertisements played correctly.

Network 100 may also have a printer 142 or other output device connected to Internet/Intranet 101 via path 141. Printer 142 prints either a screen or a document for permanent storage or for review by an account executive. Printer 142 is a standard printer that is common and well known in the art.

Figure 2:
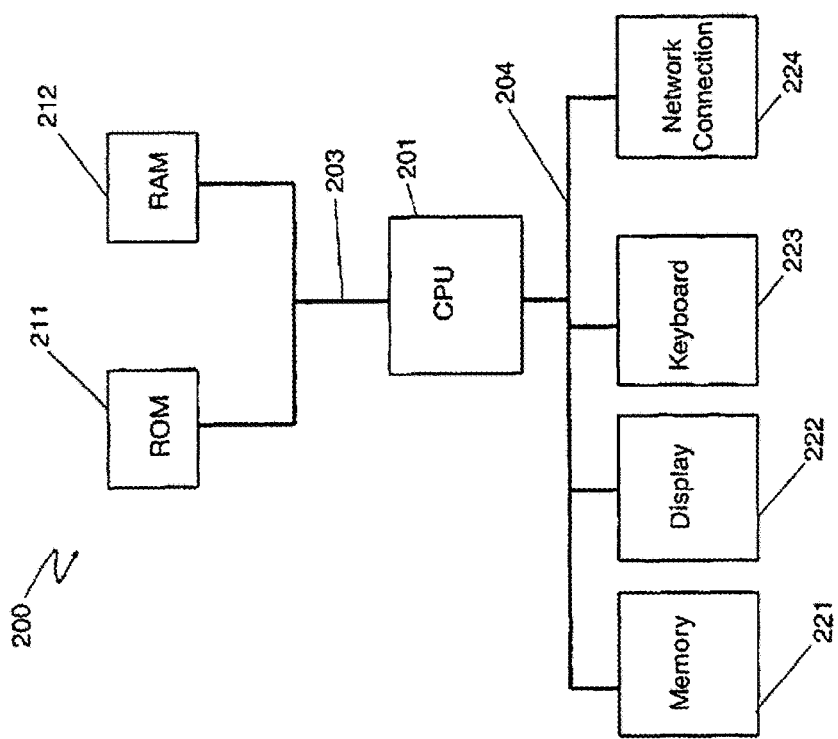
FIG. 2 illustrates a block diagram of a terminal of the network of FIG. 1 of the type utilized or encountered with the embodiments of the present invention.

FIG. 2 illustrates an exemplary embodiment of a processing system 200. One skilled in the art will recognize that each device connected to network 100 in FIG. 1 includes a processing system. However, the exact configuration and device connected to the processing system in each individual device in the network may vary.

Processing system 200 has a Central Processing Unit (CPU) 201. CPU 201 is a processor, microprocessor, or any combination of processors and microprocessor that execute instructions stored in memory to perform an application. CPU 201 is connected to a memory bus 203 and Input/Output (I/O) bus 204.

A non-volatile memory, such as Read Only Memory (ROM) 211, is connected to CPU 201 via memory bus 203. ROM 211 stores instructions for initialization and other system commands of processing system 200. One skilled in the art will recognize that any memory that cannot be written to by CPU 201 may be used for the functions of ROM 211.

A volatile memory such as Random Access Memory (RAM) 212 is also connected to CPU 201 via memory bus 204. RAM 212 stores instructions for all processes being executed and data operated upon by the executed processes. One skilled in the art will recognize that other types of memories such DRAM and SRAM may also be used as a volatile memory and that memory caches and other memory devices (Not shown) may be connected to memory bus 204.

Peripheral devices including, but not limited to, memory 221, display 222, I/O device 223, and network connection device 224 that are connected to CPU 201 via I/O bus 204. I/O bus 204 carries data between the device and CPU 201. Memory 201 is a device for storing data unto a media. Some examples of memory 221 include read/write compact discs (CDs), and magnetic disk drives. Display 222 is a monitor or display and associated drivers that convert data to a display. I/O device 223 is a keyboard, a pointing device or other device that may be used by a user to input data. Network device 224 is a modem or Ethernet "card" that connects processing system 200 to a network. One skilled in the art will recognize that exact configuration and devices connected to each processing system in network 100 may vary depending upon the operations that the processing system performs in the network.

The placement of local commercials or advertisements requires an external programming data feed that informs the system/network 100, via the programming database 133, or other database, module or application of the system/network 100, regarding which shows, movies and/or sports events are scheduled to run at particular times during each broadcast day on each channel.

Entities providing services related to the placement of local commercials (and others) during television broadcasts (e.g., cable programming) are very limited. The method for placing such local commercials is well known and lacking in efficiencies and flexibility. Current methods are also labor intensive rendering the method costlier than necessary. The current method involves a computer-implemented system receiving Schout files (SFO) intended to communicate inventory between multiple organizations selling in the same "interconnected" market. An interconnected market may have sales and traffic commercial spot delivery geographies that encompass several different multiple system operators (MSO) owning cable properties that in combination may make up a Designated Market Area (DMA). Because each system owner has a right to a certain portion of the hourly inventory to sell, it is important that the break times and sequence be present in order to manage the commercial spots that air in different time slots.

Schout files (SFO, Schedule File Out) are an industry standard file structure and may include inventory allocations, break windows, break counts and break sequences. There are two major traffic systems namely Novar® and Eclipse/Eclipse Plus® which are configured to manage television advertising.

Because the import of new or updated break structure files can cause a large amount of potentially unneeded work on the part of the traffic system, the embodiments of the present invention include a visual interface allowing traffic system operators to visualize and understand the exact nature of the changes in content of the files and determine whether to import the entire file or whether the updated information is not needed or necessary to import. An easy-to-read dashboard allows for the traffic system operator to examine the nature of the files, break times, windows and programming contained within the file. Accordingly, the traffic system operators may make fast decisions involving whether or not to import specific break structure files. Each day there may be various changes in programming made by networks that affect the number of breaks, windows and the programming content to be distributed on those networks over a number of future days. Currently, the traffic system receives emails with a file, with unknown content, for importation. For example, a body of the email may indicate that "this file contains changes in programs but not windows" or may indicate "this file contains changes in programming and windows." In other words, the emails provide little valuable information. These shortcomings are addressed by the embodiments of the present invention.

Figure 3:
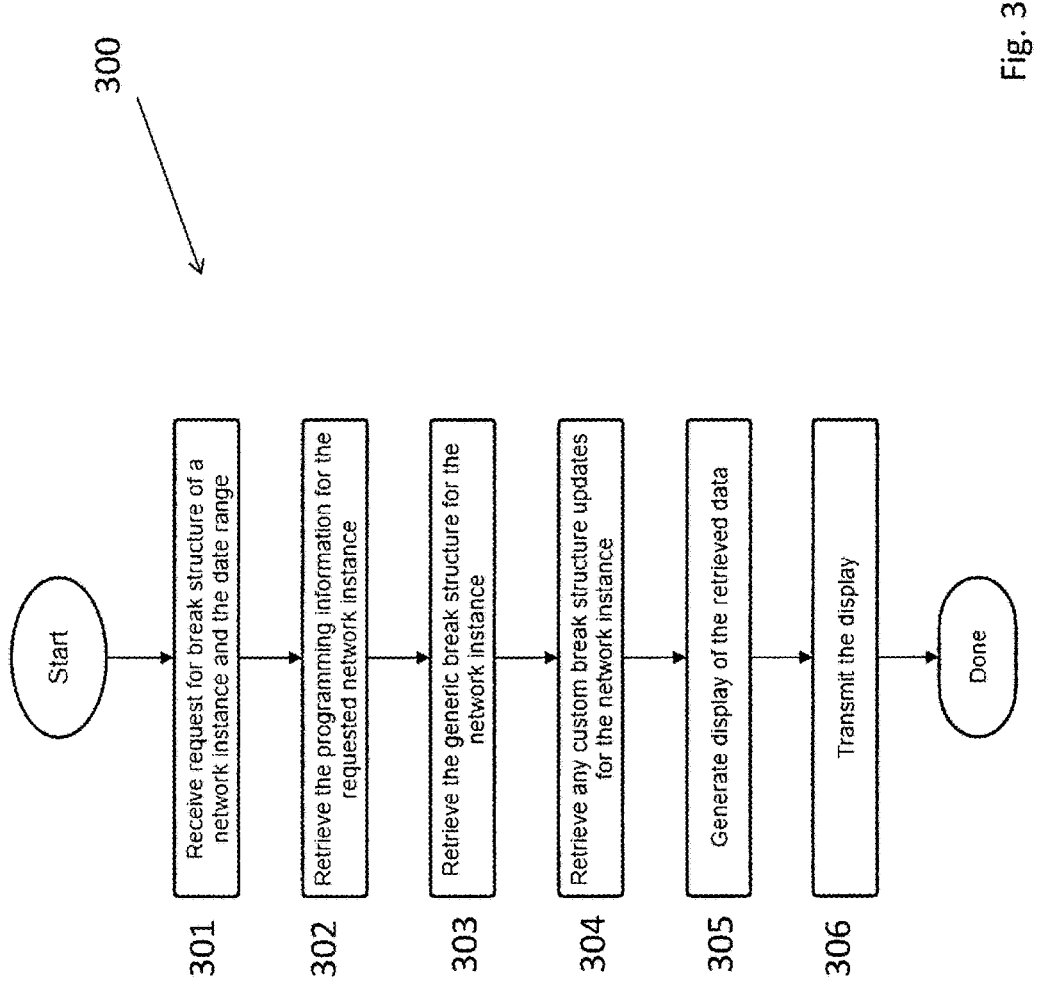
FIG. 3 illustrates a flow chart detailing a process executed to provide a display of the break structure on a user screen according to the embodiments of the present invention.

FIG. 3 shows a flow chart 300 detailing a process executed to provide a display of the break structure on a user screen according to the embodiments of the present invention. The process begins at 301 where the display is generated by the processing unit executing the process/application. At 306, the display is then transmitted to the work station of the user accessing the process. More particularly, at 301, the process receives a request to display the break structure of a network instance over a particular date range. The request includes a network instance and a date range for which to display the associated break structure. At 302, the process retrieves the programming information related to the requested network instance over the requested date range from a programming database. At 303, generic/standard break structure information is retrieved from a generic break structure database. If they exist for the requested date range, at 304, custom break structure updates for the requested network instance are retrieved from a custom break update database. At 305, a display is generated by compiling the information retrieved at 302, 303 and 304. In one embodiment, the display is an easy-to-read grid with highlighted portions making it easy to read and understand. For example, the custom temporary breaks may be highlighted to make them stand out or distinguished from the regular breaks. At 306, the display is transmitted to the workstation of a user thereby ending the process.

Figure 4:
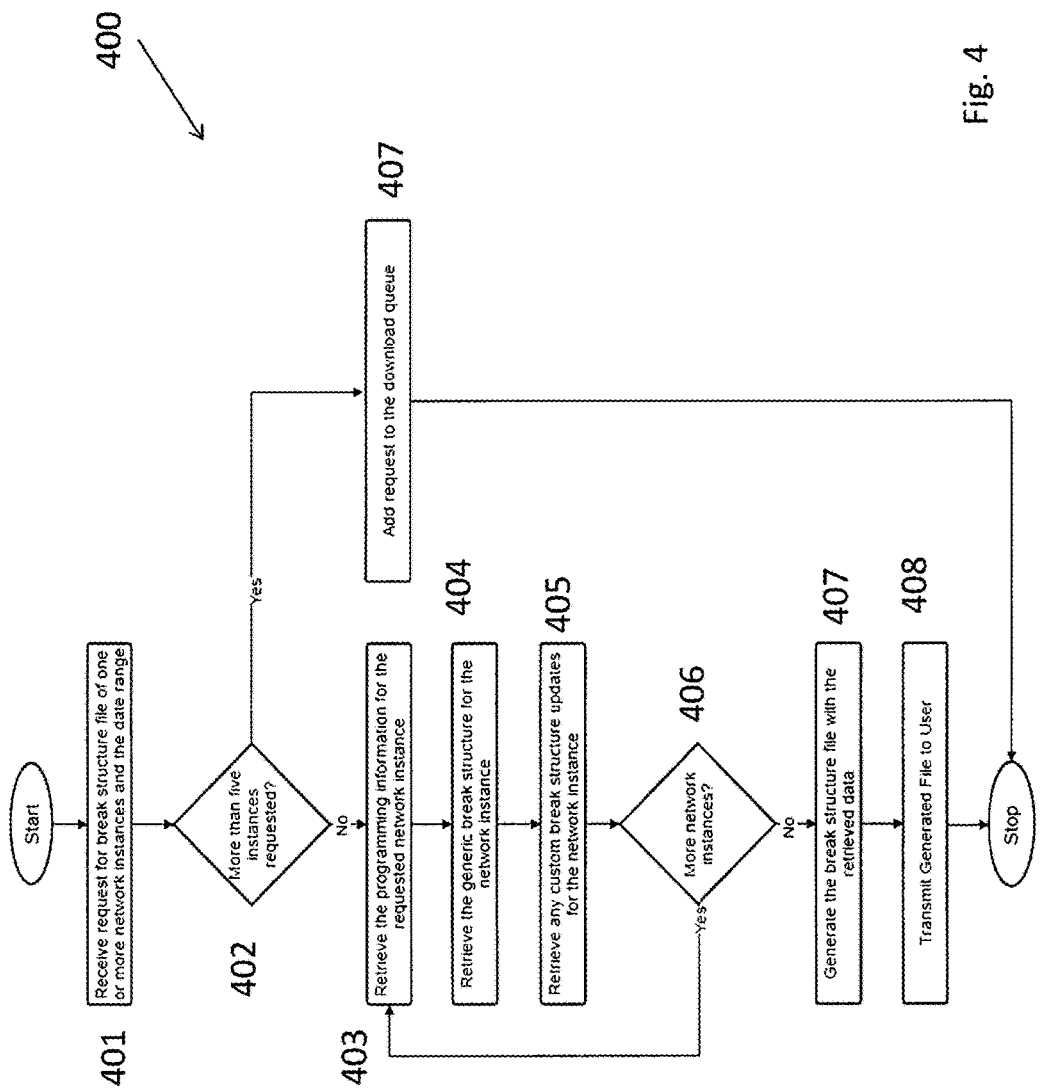
FIG. 4 illustrates a flow chart detailing a process executed to generate a break structure file responsive to a user request according to the embodiments of the present invention.

FIG. 4 shows a flow chart 400 detailing a process executed to generate a break structure file responsive to a user request according to the embodiments of the present invention. At 401, the process starts when a request is received for a break structure file. The request includes one or more network instances and a date period for which to generate a break structure file. The process then determines if the request includes more than five network instances. If more than five network instances are requested the process continues and, at 407, the request is added to a download queue to be further processed at set forth in FIG. 5. If the requested network instances are less than five, the process continues at 402. At 402, the programming information of the network instance over the requested date range is retrieved from the programming database. At 403, a generic break structure of the network instance is retrieved from the generic break structure database. If they exist, at 404, custom break structure updates for the network instance within the requested date range are retrieved from the custom break update database. Once steps 402, 403 and 404 are executed for every network instance in the request, at 305, a break structure file having a predefined format is generated by compiling the data retrieved in steps 402, 403 and 404 for each network instance. In one embodiment, the break structure file is an XML file following a predefined format importable into systems of users. At 406, the break structure generated file is transmitted to the user for download thereby ending the process.

Figure 5:
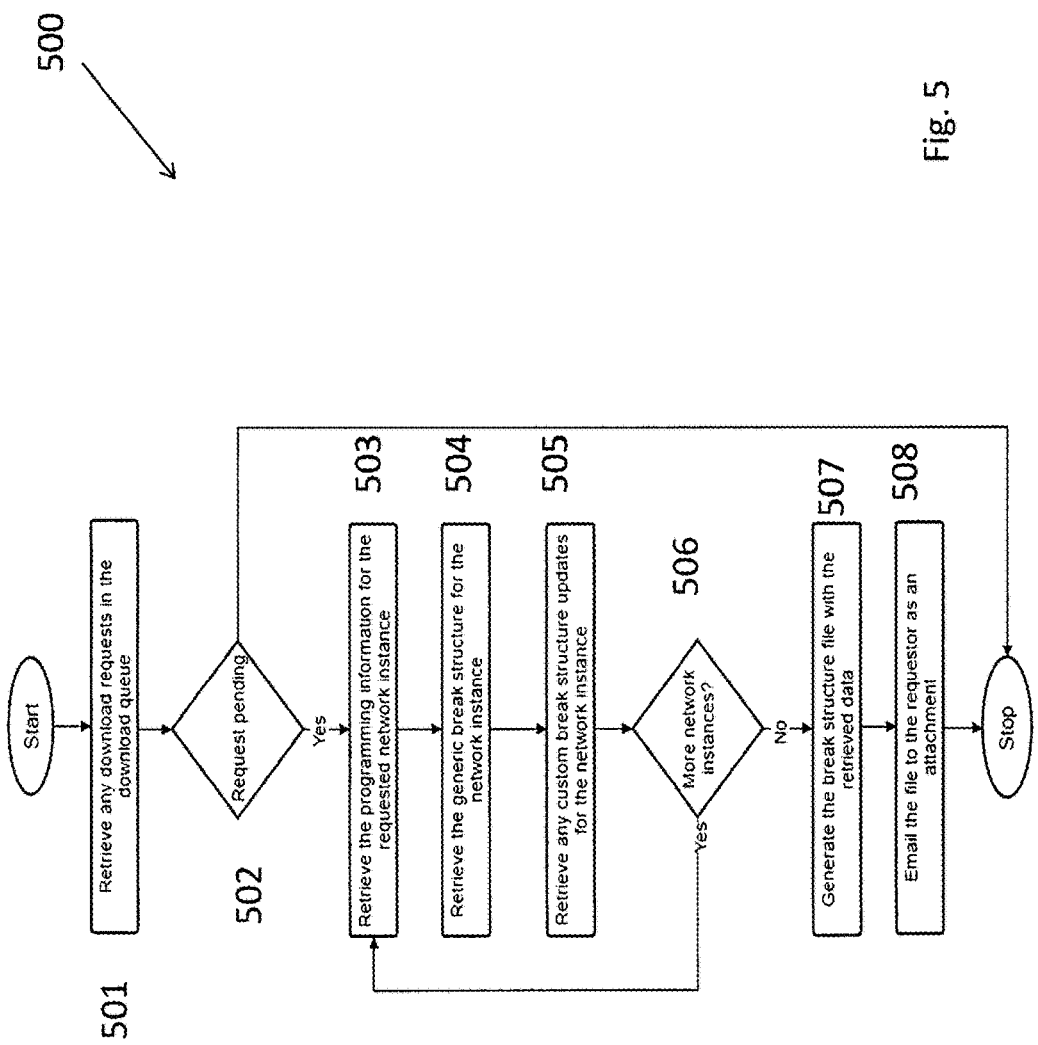
FIG. 5 illustrates a flow chart detailing a process set to run at regular intervals for processing queued break structure file download requests according to the embodiments of the present invention.

FIG. 5 shows a flow chart 500 detailing a process set to run at regular intervals for processing queued break structure file download requests according to the embodiments of the present invention. With the process illustrated in FIG. 4, at 407 the request is added to a queue and terminates. These queued requests are then processed as shown in flow chart 500. At 501, the process scans and retrieves pending requests in the break structure download queue from the client database. If, at 502, no pending requests are found the process ends. If, at 502, a pending request exists, the process continues at 503. Steps 503, 504 and 505 are executed for every network instance requested. At 503, the programming information of the network instance over the requested date range is retrieved from the programming database. At 504, the generic break structure of the network instance is retrieved from the generic break structure database. If they exist, at 505, custom break structure updates for the network instance within the requested date range are retrieved from the custom break update database. Once, at 506, it is determined that steps 503, 504 and 505 have been executed for every network instance in the request, at 507, a break structure file that follows a predefined format is generated by compiling the data retrieved at 503, 504 and 505 for each network instance. At 508, the generated file is then emailed as an attachment to the user having requested the file hereby ending the process.

Figure 6:
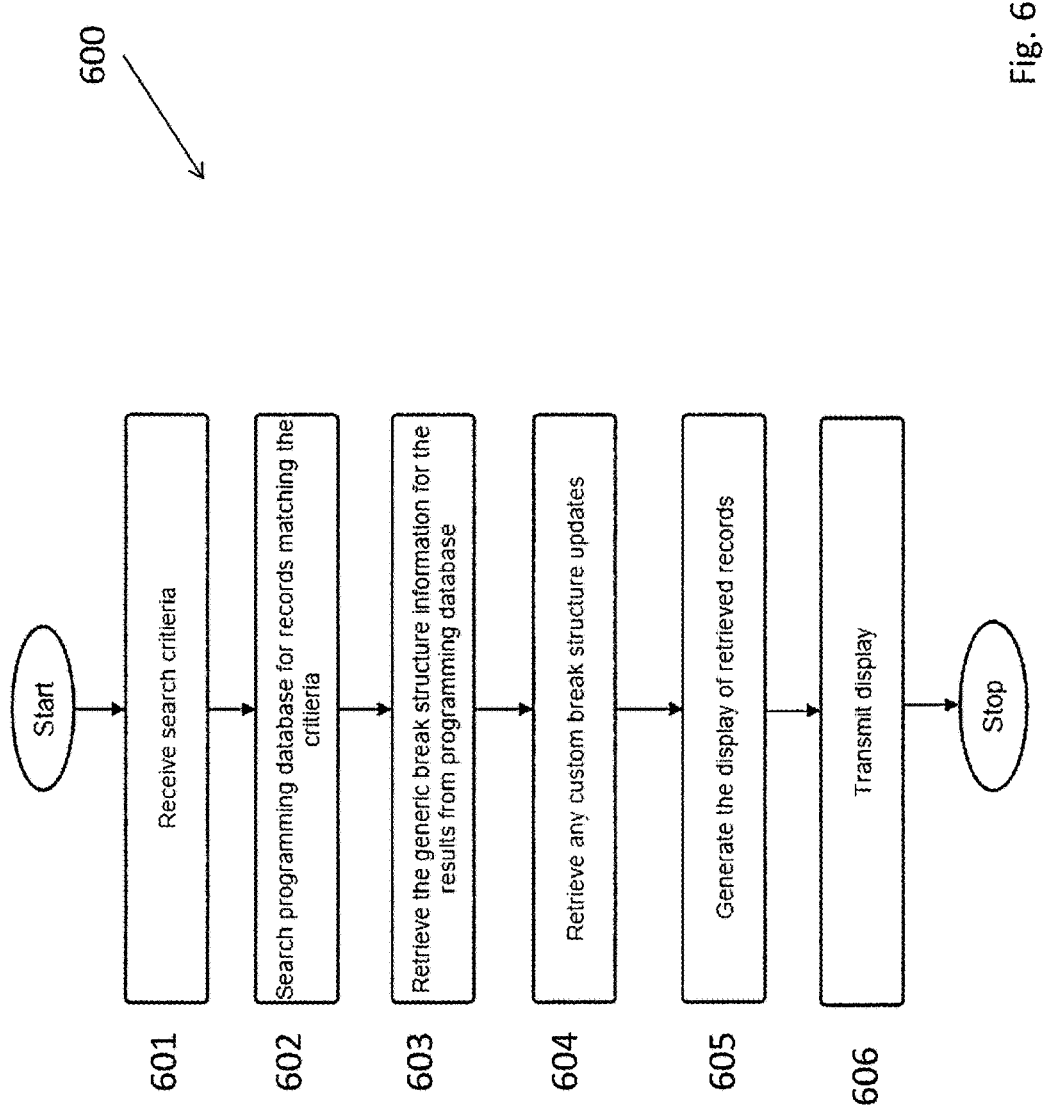
FIG. 6 illustrates a flow chart detailing a process for displaying break structures related to television shows over multiple networks searched by programming information according to the embodiments of the present invention.

FIG. 6 shows a flow chart 600 detailing a process for displaying break structures related to television shows over multiple networks searched by programming information according to the embodiments of the present invention. At 601, a request is received from a user. The request includes, but is not limited to, a title to search within the programming, a search type (i.e., whether an exact match is required or all similar titles), a date range and a group of networks to search. At 602, the programming database is searched for all the records matching the search criteria received at 601. At 603, the generic break structures for all the matches found at 602 are retrieved from the generic break structure database. At 604, any custom break updates for the programs found at 602 are retrieved from the custom break updates database. At 605, a display is generated by compiling the records retrieved at 602, 603 and 604. The display can be in an easy-to-read grid with highlighting to make it easy to read and understand. At 606, the generated display is transmitted to the work station of a user thereby ending the process.

Figure 7:
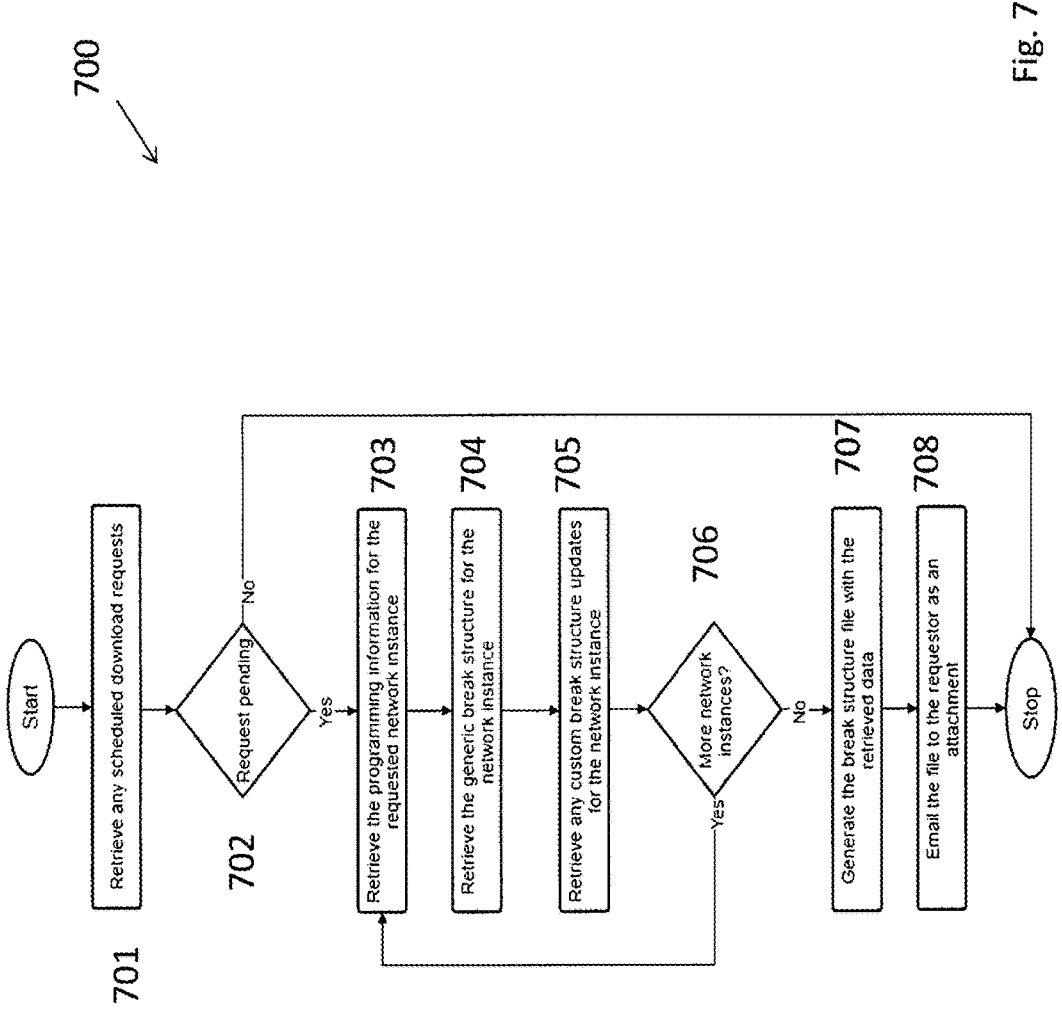
FIG. 7 illustrates a flow chart detailing a process set to run at regular intervals for processing scheduled break structure file download requests according to the embodiments of the present invention.

FIG. 7 shows a flow chart 700 detailing a process set to run at regular intervals for processing scheduled break structure file download requests according to the embodiments of the present invention. In one embodiment, clients may create requests for receiving break structure files for a set of network instances, over a number of days or a particular day and time automatically. The scheduled download requests are then processed according to the flow chart 700. At 701, automatic download requests are scanned and retrieved from the client database. If, at 702, no requests are found the process ends. If, at 702, a request for a particular day and time exists, the process continues to 703. At 703, the programming information of the network instance over the requested date range is retrieved from the programming database. At 704, the generic break structure of the network instance is retrieved from the generic break structure database. If they exist, at 705, custom break structure updates for the network instance within the requested date range are retrieved from the custom break update database. Once at 706, it is determined that steps 703, 704 and 705 have been executed for every network instance in the request, at 707 a break structure file following a predefined format is generated by compiling the data retrieved at 703, 704 and 705. At 708, the generated file is emailed as an attachment to one or more email addresses mentioned in the request at 701 thereby ending the process.

The embodiments of the present invention, as detailed above, provide a user the ability to access a system dashboard/interface/display to view a latest break structure of a network instance. Via the dashboard a user can view when the break structure of a network instance was last modified. The dashboard/display is formatted in an easy-to-read grid format with highlighting as needed. The user has the liberty to view the changes and decide whether the user wants to accept the changes or decline the changes. The user can also decide to choose to update changes throughout certain days over the date range. Users may also setup scheduled file downloads whereby the system automatically emails the users the scheduled file with the chosen network instances on every day of the week and time as selected by the user. A daily changes report transmitted by the system highlights the changes related to each of the network instances in a graphical format from which the user may decide which changes the user wants to import and the changes the user wants to ignore. Such a system provides plenty of flexibility and transparency to the users.

Figure 8A:
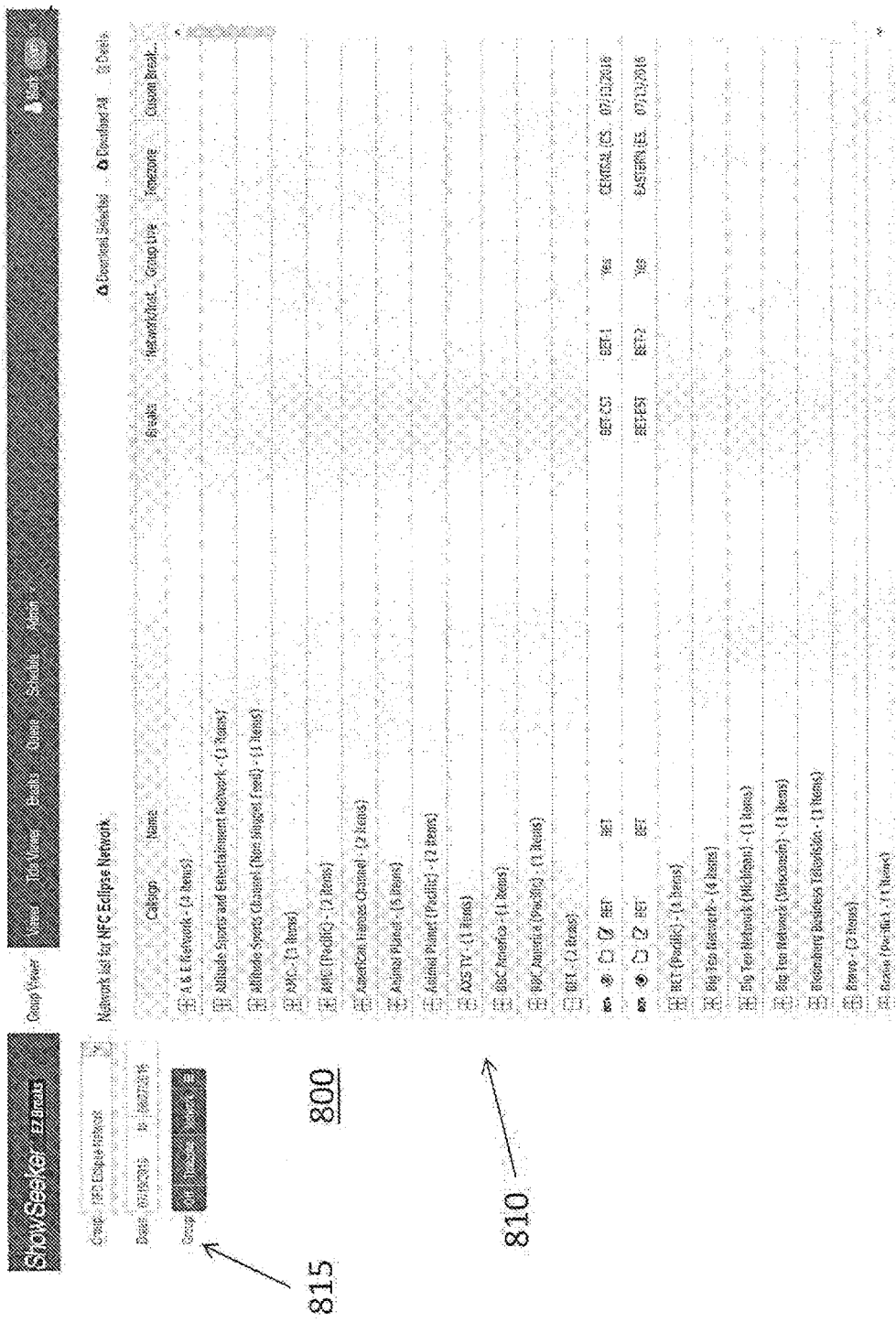
Figure 8B:
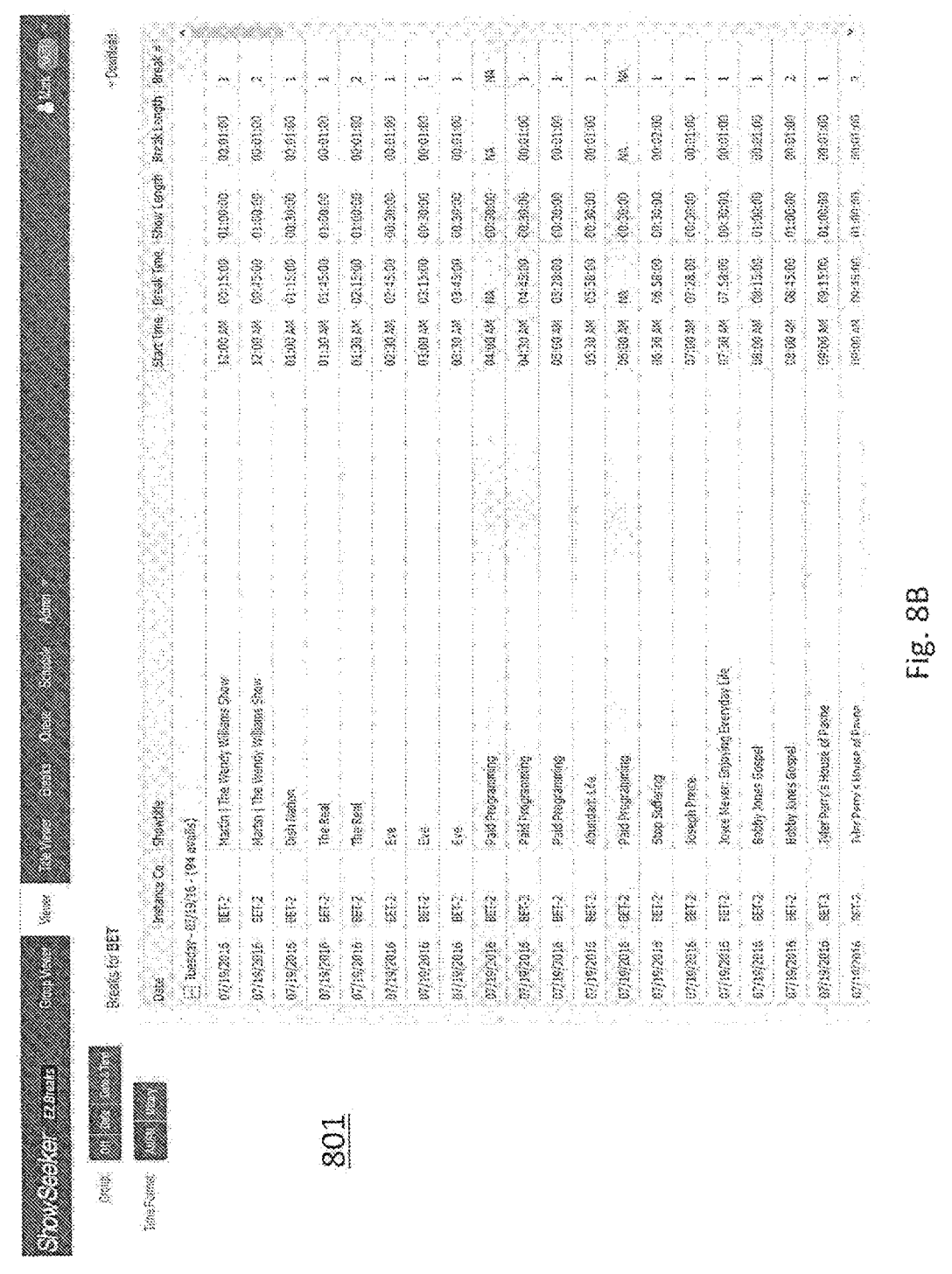
Figure 8C:
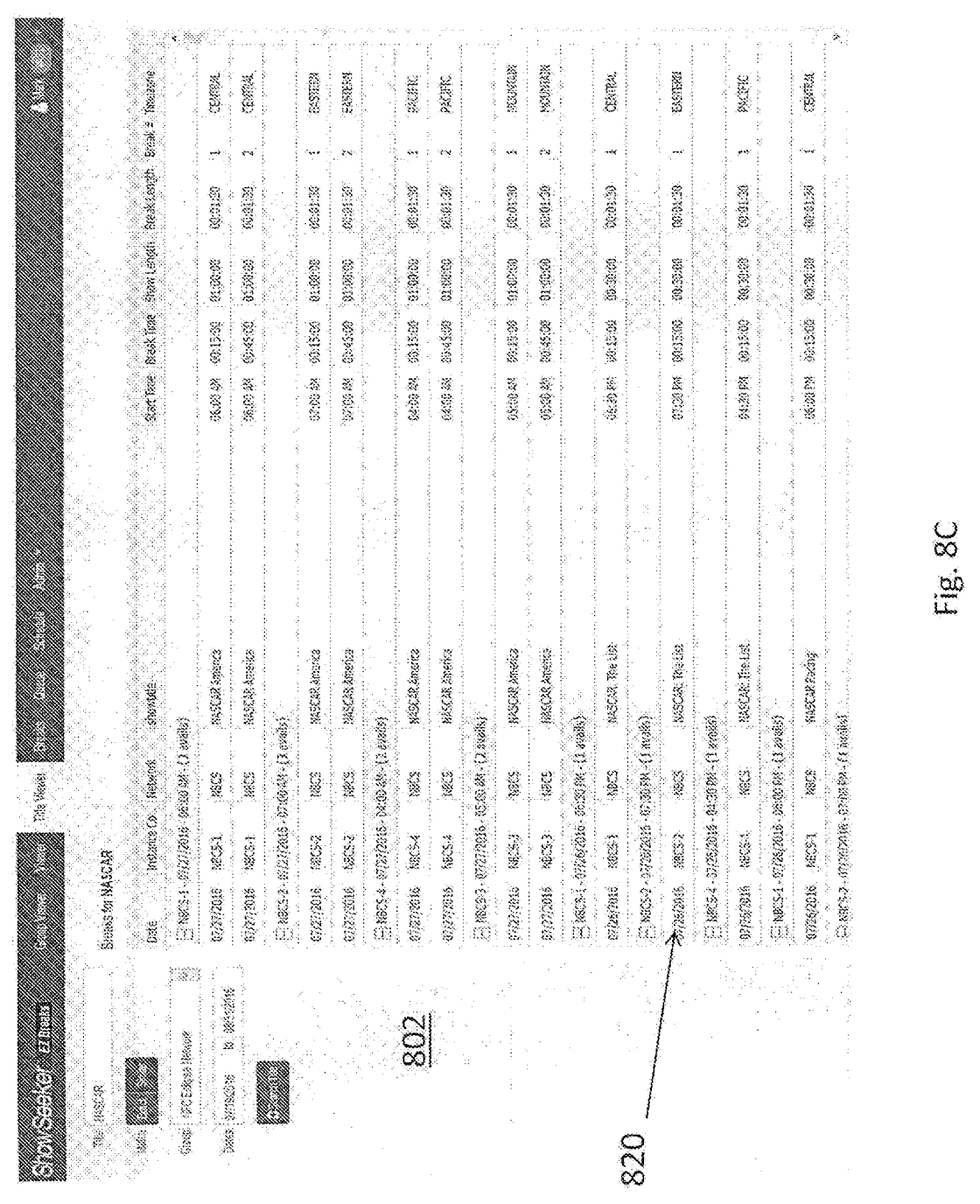
Figure 8F:
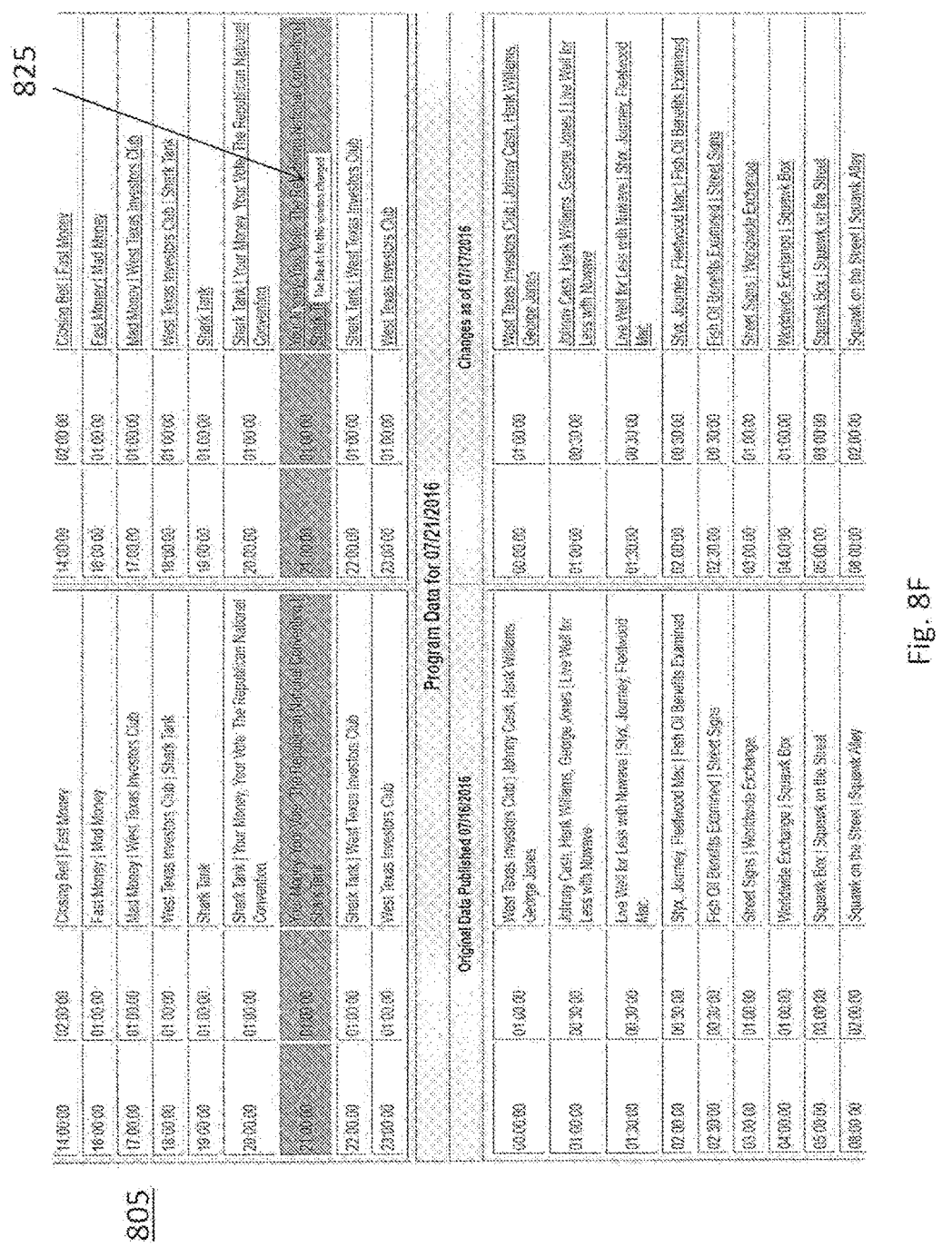

FIGS. 8A-8F show a series of screen shots 800-805 according to the embodiments of the present invention. FIG. 8A is a screen shot 800 showing a dashboard depicting networks 810. The dashboard permits searches to be conducted based on date ranges 815. FIG. 8B is a screen shot 801 showing a break viewer depicting show titles and associated start times, break times, show length, break lengths and number of breaks. FIG. 8C is a screen shot 802 showing results of a break search based on programming 820 (NASCAR in this instance). FIG. 8D is a screen shot 803 showing an exemplary email format depicting programming changes related to breaks, break windows and titles. FIG. 8E is a screen shot 804 showing programming changes on Jul. 15, 2015 from original data published on Jul. 14, 2015. FIG. 8F is a screen shot 805 showing a grid over which a user can quickly ascertain changes. In this instance, the change relates to breaks for the window as identified by the pop-up window 825.

Although the invention has been described in detail with reference to several embodiments, additional variations and modifications exist within the scope and spirit of the invention as described and defined in the following claims.

We claim:

1. A computer system for incorporating advertising breaks across one or more broadcast networks comprising:
   a processor, said processor being a hardware component of the computer system;
   memory in communication with said processor, said memory storing a plurality of instructions which when executed by said processor cause said system to: (i) responsive to an electronic request containing at least one or more network instances and one or more date ranges for which to provide a break structure, retrieve programming information from a programming database related to said electronic request and specifically said one or more network instances and said one or more date ranges, said programming information received via one or more dynamic data feeds; (ii) retrieve generic break structure information from a generic break structure database for said requested one or more network instances; (iii) retrieve any custom break structure updates for said requested one or more network instances; and (iv) generate a formatted visual presentation by utilizing said information retrieved at steps (i), (ii) and (iii) for each of said one or more network instances, said formatted visual presentation accessible and manipulatable via a user interface.

2. The computer system of claim 1 further comprising said memory storing a plurality of instructions which when executed by said processor cause said system to: transmit said visual presentation to a user client.

3. The computer system of claim 1 further comprising said memory storing a plurality of instructions which when executed by said processor cause said system to: transmit, via email, said visual presentation to a user client.

4. The computer system of claim 1 wherein said formatted visual representation is a searchable grid.

5. The computer system of claim 1 wherein said formatted visual presentation includes highlighted portions signifying when a break structure of a network instance was last modified.

6. A computer system for incorporating advertising breaks across one or more broadcast networks comprising:
   a processor, said processor being a hardware component of the computer system;
   memory in communication with said processor, said memory storing a plurality of instructions which when executed by said processor cause said system to: (i) responsive to a request for a break structure file, said request including one or more network instances and one or more date periods over which to generate a break structure file, determine a number of network instances in said request and if said number is greater than a threshold number, move said request to a download queue for later processing; (ii) if said number of network instances in said request is less than a threshold number, retrieve programming information of said one or more network instances over said requested one or more date periods from said programming database, said programming information received via one or more dynamic data feeds; (iii) retrieve a generic break structure of said one or more network instances; (iv) retrieve any custom break structure updates for said one or more network instances within said one or more requested date periods; and (v) generate a break structure file by utilizing said information retrieved at steps (ii), (iii) and (iv) for each of said one or more network instances, said formatted visual presentation accessible and manipulatable via a user interface.

7. The computer system of claim 6 wherein responsive to said number of networks instances in said request being greater than said threshold number of network instances at step (ii), said memory stores a plurality of instructions which when executed by said processor cause said system to: (i) scan and retrieve pending requests in a break structure download queue from a client database; (ii) retrieve programming information of said network instance over said requested date range from said programming database; (iii) retrieve said generic break structure of said network instance; (iv) if they exist, retrieve custom break structure updates for said network instance within said requested date range; and (v) generate a break structure file by utilizing said information retrieved at steps (ii), (iii) and (iv) for each of said one or more network instances.

8. The computer system of claim 6 wherein said break structure file is an XML file.

9. The computer system of claim 6 wherein said instructions, which when executed by said processor, further cause said system to: transmit said break structure file as an email attachment to a user.

10. A method for incorporating advertising breaks across one or more broadcast networks comprising:
   utilizing one or more processors in communication with memory storing a plurality of instructions for execution by said processor, said processor instructions for: (i) responsive to an electronic request containing programming information including at least one or more network instances and one or more date ranges, retrieving programming information from a programming database related to said electronic request and specifically said one or more network instances and said one or more date ranges, said programming information received via one or more dynamic data feeds; (ii) retrieving generic break structure information; (iii) retrieving any custom break structure updates for said requested one or more network instances; and (iv) generating a formatted visual presentation by utilizing said information retrieved at steps (i), (ii) and (iii) for each of said one or more network instances, said formatted visual presentation accessible and manipulatable via a user interface.

11. The method of claim 10 further comprising transmitting said visual presentation to a user client.

12. The method of claim 10 further comprising transmitting said visual presentation to a user client via email.

13. The method of claim 10 further comprising generating a formatted visual representation in the form of a searchable grid.

14. The method of claim 10 further comprising generating said formatted visual presentation with highlighted portions signifying when a break structure of a network instance was last modified.

\* \* \* \* \*